(12) United States Patent
Muraoka

(10) Patent No.: US 7,269,437 B2
(45) Date of Patent: Sep. 11, 2007

(54) TRANSMISSION POWER CONTROL CIRCUIT USING W-CDMA METHOD

(75) Inventor: Shinya Muraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 230 days.

(21) Appl. No.: 10/475,974

(22) PCT Filed: Apr. 26, 2002

(86) PCT No.: PCT/JP02/04254

§ 371 (c)(1),
(2), (4) Date: Jun. 23, 2004

(87) PCT Pub. No.: WO02/089362

PCT Pub. Date: Nov. 7, 2002

(65) Prior Publication Data

US 2004/0242254 A1    Dec. 2, 2004

(30) Foreign Application Priority Data

Apr. 27, 2001  (JP)  ............................. 2001-130790

(51) Int. Cl.
*H04Q 7/20*    (2006.01)
*H04B 1/00*    (2006.01)
*H04B 17/00*   (2006.01)

(52) U.S. Cl. ..................... 455/522; 455/455; 455/63.2; 455/67.11

(58) Field of Classification Search .................. 455/69, 455/522, 127.1, 127.5, 63.1, 67.11, 63.2; 370/335, 342, 331; 375/147, 130; 270/311

See application file for complete search history.

(56) References Cited

U.S. PATENT DOCUMENTS

| 6,414,946 | B1* | 7/2002 | Satou et al. .................. 370/328 |
| 6,983,165 | B1* | 1/2006 | Hiramatsu .................... 455/522 |
| 7,072,325 | B1* | 7/2006 | Sato ............................ 370/342 |
| 2002/0034216 | A1* | 3/2002 | Yanagi ........................ 375/147 |
| 2002/0094835 | A1* | 7/2002 | Hayashi et al. .............. 455/522 |
| 2003/0060225 | A1* | 3/2003 | Kayama et al. .............. 455/522 |

FOREIGN PATENT DOCUMENTS

| JP | 10-336072 | 12/1998 |
| JP | 2000-236296 | 8/2000 |
| JP | 2001-244859 | 9/2001 |

* cited by examiner

*Primary Examiner*—Tilahun Gesesse
(74) *Attorney, Agent, or Firm*—Young & Thompson

(57) ABSTRACT

A difference between DELAY values of paths is compared and when the difference is below a predetermined value, the paths are assumed to be the same and SIRs estimated for these paths are compared to each other. The SIRs are multiplied by corresponding weighting coefficients and are added in an SIR addition circuit 7. This eliminates erroneous recognition of one path as a plurality of paths, causing an enormous SIR after the addition and prevents deterioration of the line quality.

7 Claims, 5 Drawing Sheets

[Fig. 1] Prior Art
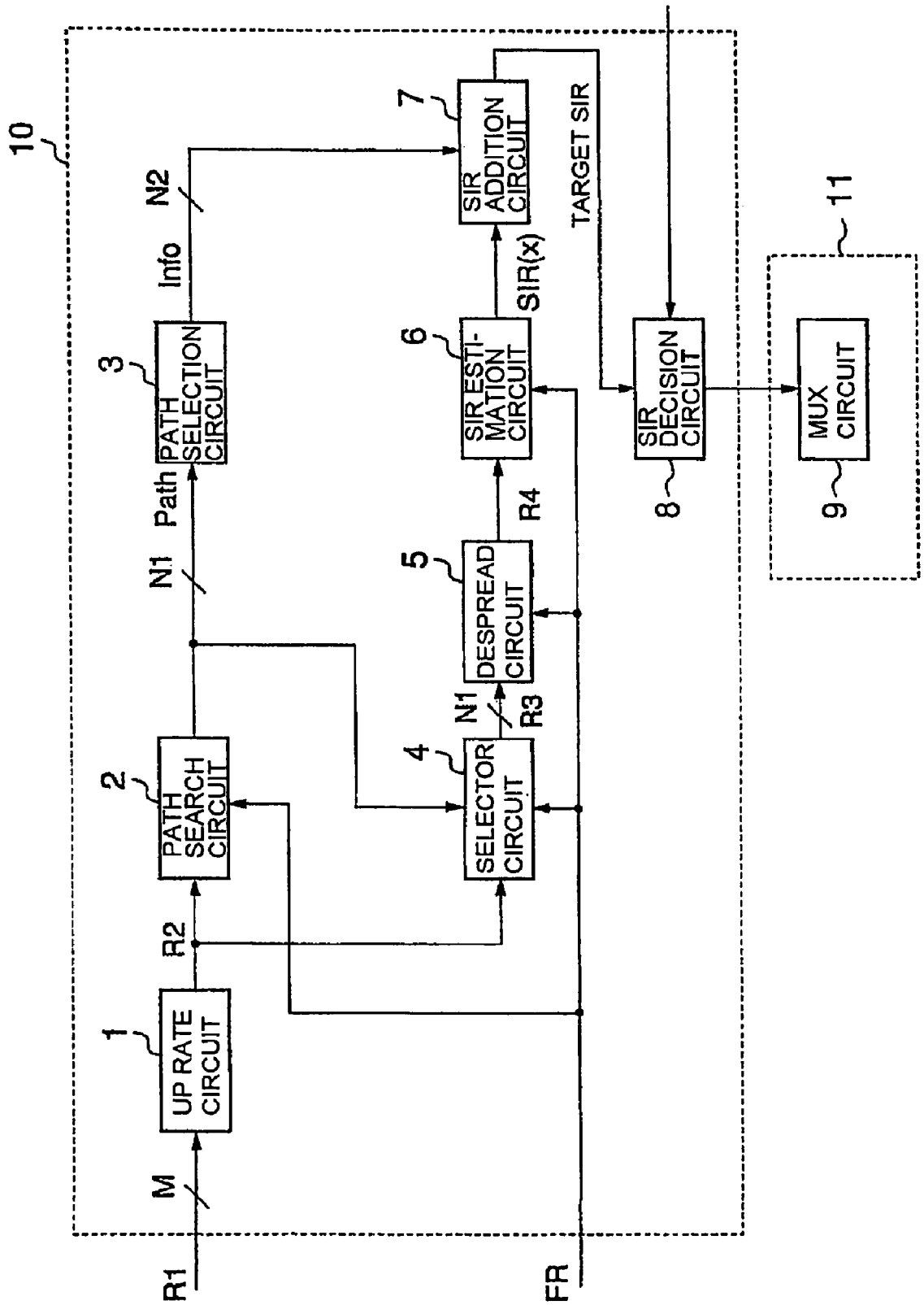

[Fig. 2]
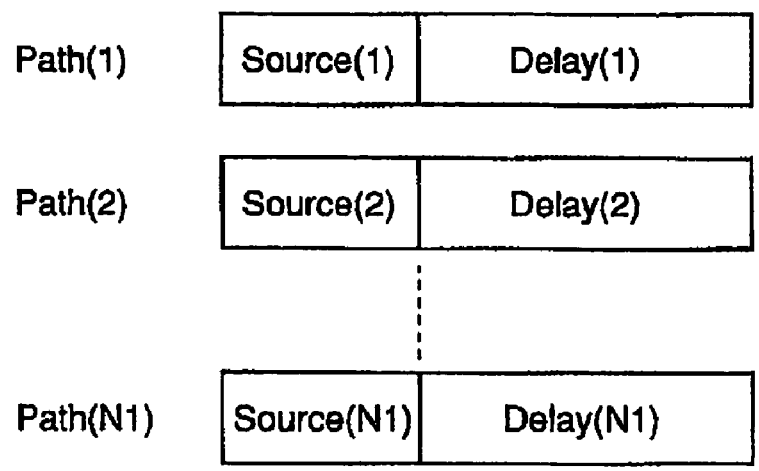
[Fig. 3]
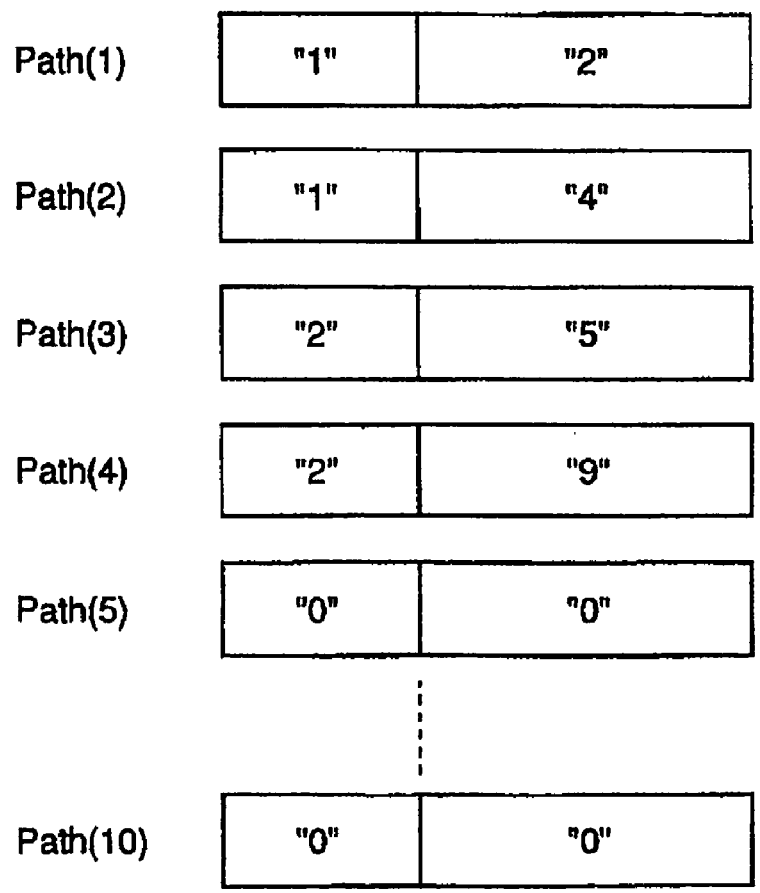

[Fig. 4]
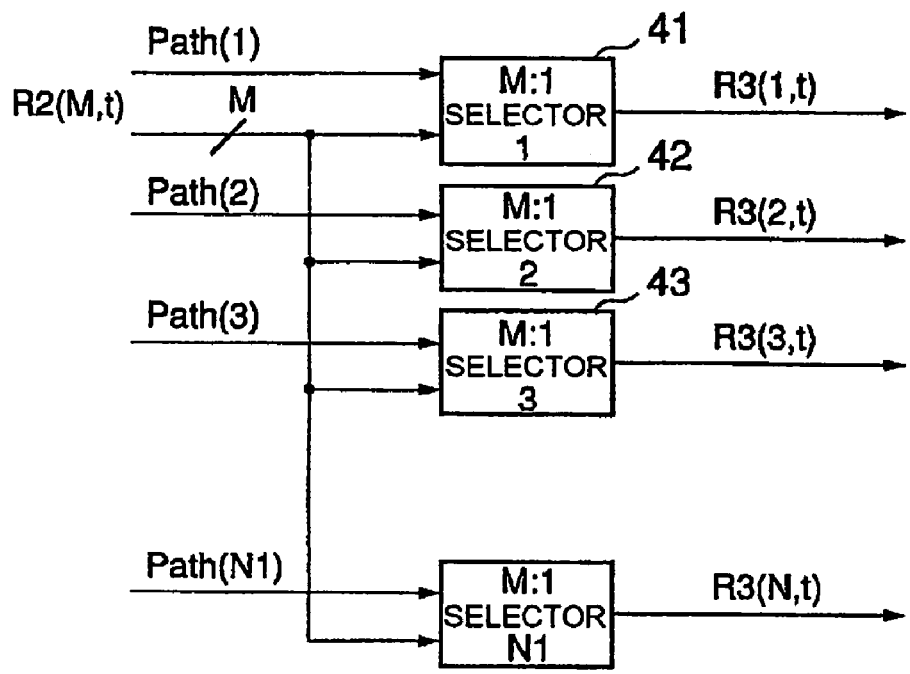
[Fig. 5]
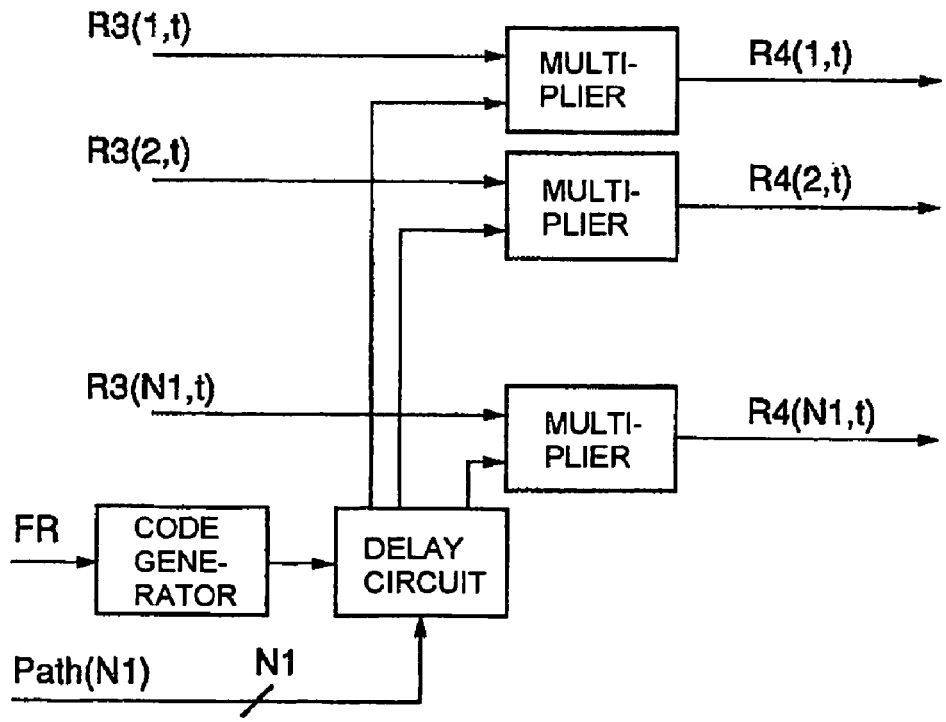

[Fig. 6]
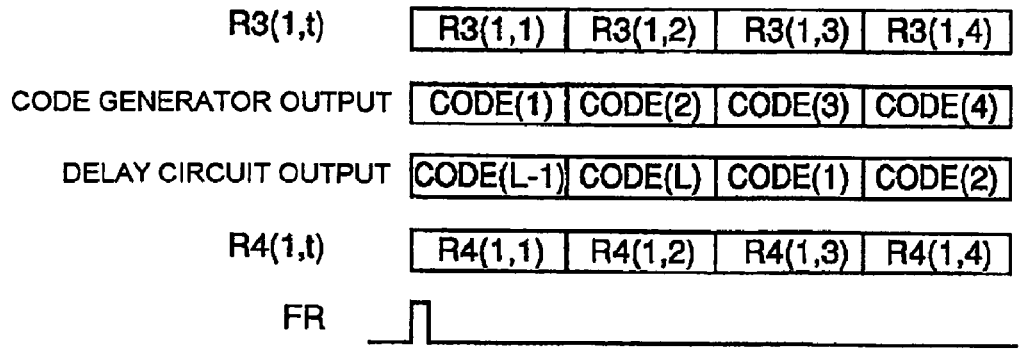
[Fig. 7]
[Fig. 8]
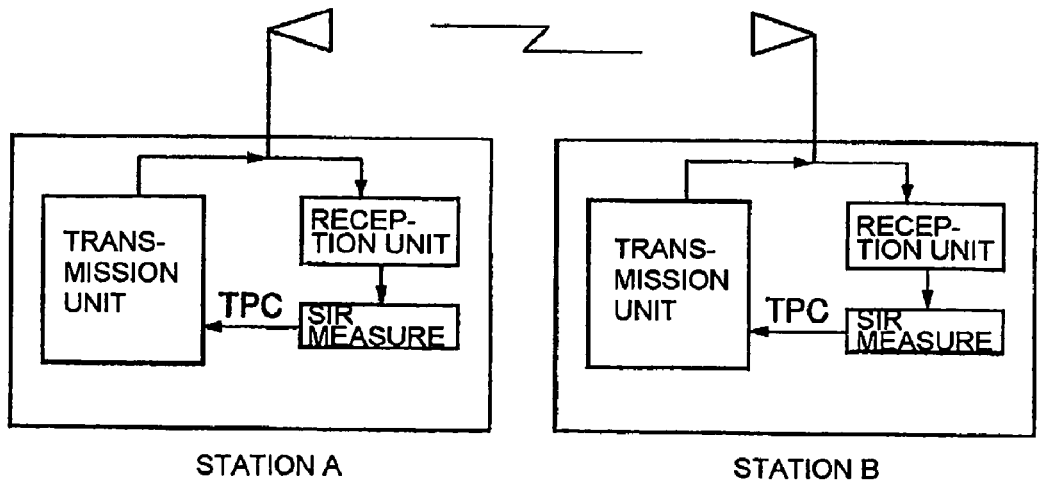

[Fig. 9]
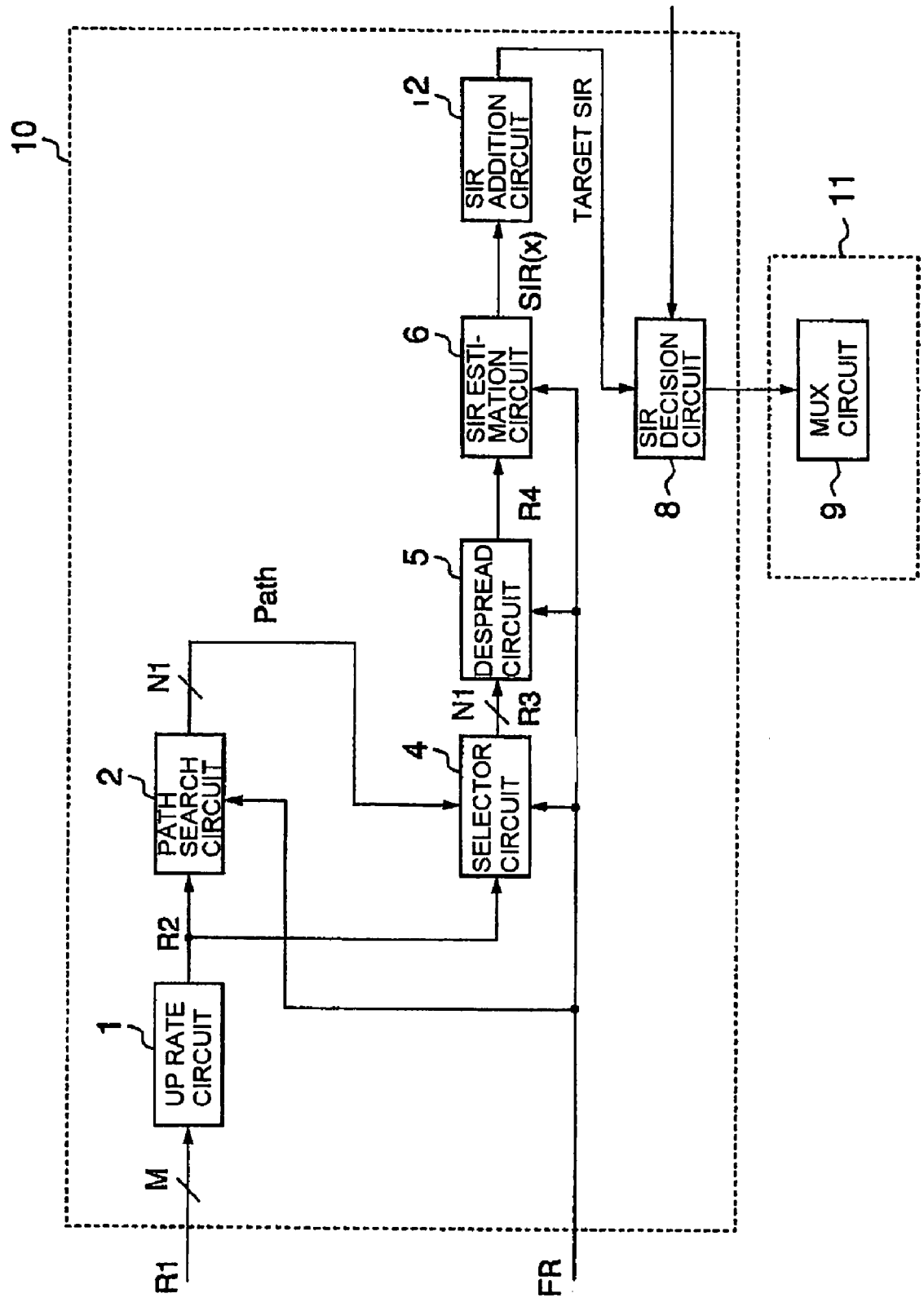

TRANSMISSION POWER CONTROL CIRCUIT USING W-CDMA METHOD

TECHNICAL FIELD

The present invention relates to an optimal transmission power control circuit used in a W-CDMA communication system.

BACKGROUND ART

Hereinafter, a known transmission power control circuit using SIR (signal-Interference Power Ratio) in W-CDMA will be described with reference to drawings.

Conventionally, in transmission power control (hereinafter refereed to as TPC), SIR of a received signal is measured in one of two stations and the SIR is compared with a predetermined SIR value. When the SIR of the received signal is smaller than the predetermined SIR value, a request for increasing a power is output to the other station. On the other hand, when the SIR of the received signal is larger than the predetermined SIR value, a request for decreasing a power is output to the other station.

FIG. 1 shows a known transmission power control circuit which uses SIR of a received signal. The known art shown in FIG. 1 is characterized in that a path selection circuit 3 is not provided and that an SIR addition circuit 12 adds all SIRs (x) input from an SIR estimation circuit 6, compared to an embedment of the present invention (a transmission power control circuit shown in FIG. 2) which will be described later. Now, the known art will be described, concentrating on the difference between the known art and the embodiment of the present invention. Other features will be described in the embodiment of the present invention.

The SIR addition circuit 12 adds all SIRs (x) of all paths after despread. Therefore, for example, when Path (1) and Path (2) are actually one Path and when SIRs (x) include SIR (1)=0.5, SIR (2)=0.3, SIR (3)=0.1, and SIR (4)=0.1, the sum of these SIRs is 1.0.

However, in this case, the SIR of one Path is added twice (Path (1) and Path (2)). Therefore, the true sum of the SIRs must be 0.8.

Herein, when a target SIR value is 0.9, the true SIR is smaller than the target value, and thus a request for increasing a power must be output to the other station. However, the measured SIR is 1.0, which is larger than the target value, and thus a request for decreasing a power is output. As a result, the quality of signal is more and more deteriorated disadvantageously.

An object of the present invention is to provide a transmission power control circuit in which the following problem can be solved. That is, when a path is erroneously detected as a plurality of paths, the SIR value of a received signal becomes larger than a target value. Accordingly, a request for decreasing a power is transmitted to the other station although the line quality is not actually improved. As a result, the line quality is further deteriorated.

DISCLOSURE OF INVENTION

In the present invention, differences between paths are calculated, and when paths whose difference is equal to or smaller than a predetermined value exist (hereinafter referred to as approximate paths), the SIR values of those paths are compared, the SIR values are weighted based on the comparison result, and then the SIR values are added.

For example, the SIRs of two approximate Path A and Path B are SIR_A and SIR_B, respectively. When SIR_A is larger than SIR_B, X*(SIR_A) and Y*(SIR_B) are added so as to obtain a sum SIR value. When X=1 and Y=0, SIR_B is ignored.

Accordingly, when a path is erroneously detected as a plurality of paths and when the sum of SIRs becomes larger than the true sum value, a request for decreasing a transmission power for improvement of signal quality is not output to the other station.

A transmission power control circuit using the W-CDMA scheme according to the present invention includes an SIR estimation circuit for estimating S/N ratio of each of 1 to N signals (N is an integer which is 1 or more) from a despread circuit and outputting estimation results (hereinafter referred to as SIR values); and SIR addition means for adding the 1 to N SIR values output from the SIR estimation circuit. When a difference between delay values to an FR signal indicating a frame timing of paths among input 1 to N paths is equal to or smaller than a predetermined value, the SIR addition means regards those paths as the same, multiplies the 1 to N SIR values by corresponding weighting coefficients, and then adds the SIR values.

The SIR Addition means includes an SIR addition circuit which is connected to the output side of the SIR estimation circuit and which adds the 1 to N SIR values output from the SIR estimation circuit; and a path selection circuit for checking whether or not approximate paths which have been received from a same antenna and which have a predetermined difference between delay values to the FR signal exist based on 1 to N pieces of input path information, and transmitting a control signal indicating approximation information to the SIR addition circuit when at least two approximate paths exist.

The SIR addition circuit does not add all the SIR values from the SIR estimation circuit, but compares SIR values of approximate paths if any based on the approximation information, and multiplies the SIR values by the corresponding weighting coefficients so as to add the SIR values.

The SIR addition circuit adds the SIR values by ignoring a smaller SIR value in the SIR values of the approximate paths after weighting.

The transmission power control circuit further includes an SIR decision circuit for comparing a result SIR value obtained by weighting and adding with a predetermined target SIR value so as to output a TPC bit indicating whether or not the result SIR value is larger than the target SIR value; and a transmission unit for writing the TPC bit in a predetermined place and transmitting the TPC bit to the other station.

The TPC bit requests decrease of a transmission power to the other station when the result SIR value is larger than the target SIR value, and requests increase of a transmission power to the other station when the result SIR value is smaller than the target SIR value.

BRIEF DESCRIPTION OF THE DRAWINGS

FIG. 1 is a block diagram of a known transmission power control circuit using SIR of a received signal in W-CDMA.

FIG. 2 is a block diagram of a transmission power control circuit using SIR of a received signal in W-CDMA according to an embodiment of the present invention.

FIG. 3 shows 1 to N1 pieces of path information Path (N1).

FIG. 4 shows an example of a path search result.

FIG. 5 shows the configuration of a selector circuit.

FIG. 6 shows the configuration of a despread circuit.

FIG. 7 shows data structures of CODE generator output and DELAY circuit output when R3 (N1, t) is despread so as to output R4 (N1, t).

FIG. 8 shows a format of data transmitted/received between two stations.

FIG. 9 is a block diagram of the two stations, which measure SIR of a received signal, notify each other whether or not the SIR is larger or smaller than a target value by using a TPC unit, no as to control a transmission power.

BEST MODE FOR CARRYING OUT THE INVENTION

Hereinafter, a transmission power control circuit using SIR of a received signal in W-CDMA according to an embodiment of the present invention will be described with reference to the drawings. FIG. 2 is a block diagram showing the transmission power control circuit using SIR of a received signal in W-CDMA according to the embodiment of the present invention. In the following description, * represents multiplication.

Signals R1 (M, t) are input to an up rate circuit 1 through 1 to M antennas, which convert radio signals to digital signals. R1 (M, t) means a signal input through antenna N at time t. The rate of each input signal is represented by a*Fc (Fc is chip rate). In this circuit, the rate of each signal is further increased by b times. Then, signals R2 (M, t) having the rate of a*b*Fc are output to a path search circuit 2 and a selector circuit 4.

The path search circuit 2 detects the correlation value of each of the input 1 to M signals R2 (M, t) by using a CODE predetermined with reference to an PA signal indicating a frame timing, and selects 1 to N1 signals of higher correlation values.

Selected signals are output in parallel or in series as 1 to N1 pieces of path information Path (N1) shown in FIG. 3. In the path information, a SOURCE portion indicates the antenna through which the signal has been input A DELAY portion indicates the deviation amount to the FR signal. Since a multipath phasing signal is input to each antenna, a plurality of paths may be selected from a SOURCE.

FIG. 4 shows an example of a path-search result. Herein, the number of antennas is 2 (M=2) and the number of searched paths are 10 (N1=10). In FIG. 4, the number of selected effective paths is 4 (path whose SOURCE is 0 is ineffective), in which two paths have been selected from each of the first and second antennas. As shown, the signals from the first antenna are delayed from the FR timing by "2" and "4", respectively, and the signals from the second antenna are delayed by "5" and "9", respectively. The unit of the DELAY portion is 1/(n1*n2*Fc).

As shown in FIG. 5, the selector circuit 4 includes 1 to N1 selectors of M:1. The 1 to M signals are input to the selectors from the up rate circuit 1. Each selector selects a signal specified by the SOURCE portion of the path information and outputs the selected signal to a despread circuit 5 in the next stage.

When the path information shown in FIG. 4 is provided, the selectors 41 and 42 in FIG. 5 select signals R2 (1, t) from the first antenna. The selectors 43 and 44 select signals R2 (2, t) from the second antenna. Output of other (N1-4) selectors is "0".

The despread circuit 5 includes 1 to N1 multipliers, a CODE generator, and 1 to N1 DELAY circuits, as shown in FIG. 6. The CODE generator generates CODEs of a predetermined code length L in synchronization with FR timing signals. The DELAY circuit delays an input CODE by a value of the DELAY portion of the path information.

For example, a CODE despreading R3 (1, t) is delayed by "2" in the DELAY circuit, as shown in FIG. 7, since the DELAY value corresponding to this signal is "2". The multipliers despread signals of rate (a*b*Fc) by using the above-described CODE and output R4 (N1, t) whose signal rate is Fs. Fs represents a symbol rate.

An SIR estimation circuit 6 estimates the S/N ratio of each of the received 1 to N1 signals and outputs estimation results SIRs (x) to an SIR addition circuit 7 in the next stage. Herein, x is 1 to N1. A path selection circuit 3 determines whether or not paths which have been received from a same antenna and whose Delay values are approximate by a predetermined value exist based on the input path information.

For example, the threshold of approximation is set to "3". In the example shown in FIG. 4, the Delay values of the signals from the second antenna are "5" and "9", respectively. Thus, these signals are determined not to be approximate. On the other hand, the Delay values of the signals from the first antenna are "2", and "4", and thus these signals are determined to be approximate. In this case, a detection signal S2 is represented in the following way. Info (1; 11000 . . . 0), Info (2; 11000 . . . 0), Info (3; 00000 . . . 0), Info (4; 00000 . . . 0), . . . , and Info (N1; 00000 . . .).

Info (1; 1100000 . . . 0) indicates whether or not a path which is approximate to Path 1 exists, and indicates that Path 1 is approximate to Path 2 in this case.

The SIR addition circuit 7 adds 1 to N1 SIR values (SIRs (x)) input from the above-described SIR estimation circuit 6. However, all of the SIRs (x) are not added. Instead, the above-described approximation information info is referred to. If a path is approximate to another path, the SIRs of the approximate paths are compared, and the SIRs (x) are multiplied by corresponding weighting coefficients and then are added.

In the above-described example, since Path 1 is approximate to Path 2, SIR (1) is compared with SIR (2). When SIR (1) is larger than SIR (2) and when weighting coefficients are 1 and 0, the sum of SIRs can be represented by the following equation (1).

$$SIR=1*SIR(1)+0*SIR(2)+SIR(3)+SIR(4) \quad (1)$$

As can be understood from the equation, in this weighting method, a smaller SIR in the SIRs of the approximate paths is ignored. The summed SIR value is input to an SIR decision circuit 8. The SIR decision circuit 8 compares the input SIR with a given target SIR value and outputs a TPC bit to an MUX circuit 9 in a transmission unit. When the summed SIR is larger than the target SIR, the TPC bit is "0", and when the summed SIR is mailer than the target SIR, the TPC bit is "1". Herein, "1" represents a request for increasing a transmission power to another station and "0" represents a request for decreasing a transmission power.

The MUX circuit 9 in the transmission unit 11 writes the TPC bit in a predetermined place as shown in FIG. 8 and notifies the other station.

Next, the operation of the above-described embodiment will be described. FIG. 9 is a block diagram of two stations which are preconditions of the present invention. FIG. 8 shows a format of data transmitted/received between these stations. DATA 1 and DATA 2 in FIG. 8 represent user data. A TPC portion indicates a transmission power control request from the other station. In the transmission power control circuit of the present invention, each of the two stations shown in FIG. 9 measures SIR of a received signal, notifies the other station that SIR is larger or smaller than the target value by using the TPC portion, and requests increase or decrease of the power depending on the SIR value.

The operation of the up rate circuit 1 and the path search circuit 2 shown in FIG. 2 has been described above and thus is not described here. The selector circuit 4 selects necessary signals from among signals R2 (y, t) in accordance with the SOURCE portion of PATH (X), where y=1, 2, . . . , and M, and outputs R3 (x, t), where x=1, 2, . . . , and N1. "x" represents the number of searched paths (N1).

In the example shown in FIG. 4, two R2 (1, t) signals and two R2 (2, t) signals are output. The remainder (N2–4) is 0. That is, the relationship between R2 (y, t) and R3 (x, t) is represented as follows. R3 (1, t)=R2 (1, t), R3 (2, t)=R2 (1, t), R3 (3, t)=R2 (2, t), R3 (4, t)=R2 (2, t), R3 (x)=0. Herein, x=5, 6, . . . , and N1.

The despread circuit 5 despreads R3 (x, t) in each path by using a predetermined CODE and outputs signals R4 (x, t) of a symbol rate (Fs). As described above, the tang of a generated CODE is adjusted in accordance with the DELAY value of path information PATH (x). Adjusted CODE is used as a despread code. The signal R4 (x, t) is represented by the following equation (2). Herein, CODE of a code length L is represented by C(k) and a timing function of each Path based on the DELAY value is represented by t(x). t represents a t symbol.

$$R4\ (x,\ t) = \Sigma\{R3(x,\ k)^*C(k-t(x))\} \quad (2)$$

For example, in PATH (1), that is, when x=1, the DELAY value is "2" and thus t(1)=2. Accordingly, R4 (1, t) is represented by the following equation (3).

$$R4\ (1,\ t) = \Sigma\{R3(1,\ k)^*C(k-2)\} \quad (3)$$

The SIR estimation circuit 6 calculates the S/N ratio of each of input signals R4 (x, t) and outputs SIR values SIRs (x).

The path selection circuit 3 checks whether ox not paths which have been received from a same antenna and whose timings are approximate to each other by a predetermined value (paths whose DELAY values are approximate) exist based on the input 1 to N pieces of path information PATH (x) When approximate paths exist, a control signal Info (x: z1, z2, . . . , and zN1) indicating that fact is transmitted to the SIR addition circuit 7 in the next stage.

For example, when Path (1) is approximate to Path (2), z1 and z2 in Info (1:, ,) and Info (2:, ,) is 1, that is, Info (1: 1, 1, 0, 0, . . . , 0) and Info (2: 1, 1, 0, 0, . . . , 0).

The SIR addition circuit 7 compares SIRs of the Paths in which zx is 1 based on the Info signal for the input SIRs (x) and performs weighting, so as to add the corresponding SIRs (x). For example, when the weighting coefficient is α(x) and when the path selection circuit 3 determines that PATH (1) is approximate to PATH (2), the SIR addition circuit 7 compares SIR (1) with SIR (2). When SIR (1) is larger than SIR (2), α(1)=1 and α(2)=0 are satisfied. In the opposite case, α(1)=0 and α(2)=1 are satisfied. When a PATH is approximate to no PATH, the weighting coefficient of SIR corresponding to the PATH is set to "1". Then, 1 to N α(x)*SIRs(x) are added by using the following equation (4) and the result is output to the SIR decision circuit 8.

$$SIR = \Sigma \alpha(x)^* SIRs(x) \quad (4)$$

The calculated SIR is compared with a predetermined target value by the SIR decision circuit 8, which outputs a TPC bit indicating the result. When the calculated SIR is smaller than the target value, the polarity of the TPC bit is "1" so as to allow the other station to increase a transmission power. Otherwise, the polarity of the TPC bit is "0".

The MUX circuit 9 in the transmission unit 11 writes the TPC bit in transmission data and transmits the data to the other station.

INDUSTRIAL APPLICABILITY

According to the present invention, when one path is erroneously recognized as a plurality of paths during path search, weighting is performed depending on the value of each SIR, and if necessary, only the largest SIR is added. Accordingly, the value of SIR does not become enormous erroneously.

In the known art, when one path is erroneously recognized as a plurality of paths, the sum of SIR values becomes larger than the true sum. In this case, a request for decreasing a transmission power is output to the other station although the signal quality is not improved, and as a result, the signal quality is further deteriorated. The present invention solves this problem. During path search, approximate paths may be protected so that a path is not recognized as a plurality of paths. However, this method is not always optimal for estimating SIR, because the range of approximate paths at this time is determined so that many paths can be added so as to obtain optimal data quality after receiving RAKE, which is usually used in W-CDMA (approximate paths are more likely to be included). On the other hand, in the present invention, paths are selected based on other parameters before adding SIR values, and thus an optimal parameter for SIR estimation can be determined.

Furthermore, path search is usually performed by using an average of predetermined time, and thus the time of obtained path information is not strictly the same as the time of data used for SIR estimation. In the present invention, even if the state of paths changes during the time, paths can be correctly selected to some extent.

The invention claimed is:

1. A transmission power control circuit using the W-CDMA scheme, comprising:
    an SIR estimation circuit for estimating S/N ratio of each of 1 to N signals (N is an integer which is 1 or more) from a despread circuit and outputting estimation results (hereinafter referred to as SIR values); and
    SIR addition means for adding the 1 to N SIR values output from the SIR estimation circuit,
    wherein, when difference between delay values to an FR signal indicating a frame timing of paths among input 1 to N path is equal to or smaller than a predetermined value, the SIR addition means regards those paths as the same, multiplies the 1 to N SIR values by corresponding weighting coefficients, and then adds the SIR values.

2. A transmission power control circuit using the W-CDMA scheme, comprising:
    an SIR estimation circuit for estimating S/N ratio of each of 1 to N signals (N is an integer which is 1 or more) from a despread circuit and outputting estimation results (hereinafter referred to as SIR values);
    an SIR addition circuit which is connected to the output side of the SIR estimation circuit and which adds the 1 to N SIR values output from the SIR estimation circuit; and
    a path selection circuit for checking whether or not approximate paths which have been received from a same antenna and which have a predetermined difference between delay values to an FR signal exist based on 1 to N pieces of input path information, the FR signal indicating a frame timing of paths among inputs 1 to N paths, and transmitting a control signal indicating approximation information to the SIR addition circuit when at least two approximate paths exist, wherein, when a difference between delay values and the FR signal is equal to or smaller than a predetermined value, the SIR addition circuit regards those paths as the same, multiplies the 1 to N SIR values by corresponding weighting coefficients, and then adds the SIR values.

3. A transmission power control circuit using the W-CDMA scheme according to claim 2, wherein:

the SIR addition circuit does not add all the SIR values from the SIR estimation circuit, but compares SIR values of approximate paths if any exist based on the approximation information, multiplies the SIR values by the corresponding. weighting coefficients, and then adds the SIR values.

4. A transmission power control circuit using the W-CDMA scheme according to claim 3, wherein:

the SIR addition circuit adds the SIR values by ignoring a smaller SIR value in the SIR values of the approximate paths after weighting.

5. A transmission power control circuit using the W-CDMA scheme according to claim 2, further comprising:

an SIR decision circuit for comparing a result SIR value obtained by weighting and adding with a predetermined target SIR value so as to output a TPC bit indicating whether or not the result SIR value is larger than the target SIR value; and a transmission unit for writing the TPC bit in a predetermined place and transmitting the TPC bit to the other station.

6. A transmission power control circuit using the W-CDMA scheme according to claim 5, wherein:

the TPC bit request decrease of a transmission power to the other station when the result SIR value is larger than the target SIR value, and request increase of a transmission power to the other station when the result SIR value is smaller than the target SIR value.

7. A transmission power control circuit using the W-CDMA scheme, comprising:

an SIR estimation circuit for estimating S/N ratio of each of 1 to N signals (N is an integer which is 1 or more) from a despread circuit and outputting estimation results (hereinafter referred to as SIR values); and SIR addition means for determining that two paths of 1 to N input paths are a same path when differences between delay values and an FR signal indicating a frame timing of the two paths is equal to or smaller than a predetermined value, for deriving corresponding weighting coefficients based on the determination whether the two paths are the same path, for multiplying the 1 to N SIR values by the corresponding weighting coefficients, and for then adding the weighted SIR values.

* * * * *